United States Patent [19]

Spietschka et al.

[11] 4,018,791
[45] Apr. 19, 1977

[54] PROCESS FOR THE PREPARATION OF HIGHLY PURE HALOGENATED PHTHALOCYANINE PIGMENT

[75] Inventors: Ernst Spietschka, Oberauroff, Taunus; Siegfried Schiessler; Wolfgang Tronich, both of Frankfurt am Main, all of Germany

[73] Assignee: Hoechst Aktiengesellschaft, Frankfurt (Main), Germany

[22] Filed: Dec. 21, 1973

[21] Appl. No.: 427,315

[30] Foreign Application Priority Data

Dec. 22, 1972 Germany .................... 2262972

[52] U.S. Cl. .................... 260/314.5; 260/42.21; 260/246 R; 260/273; 260/279 QA; 260/281 P; 260/323; 260/357; 260/358; 260/360; 260/362

[51] Int. Cl.² .................... C09B 47/04

[58] Field of Search ............... 260/281, 314.5, 279, 260/396, 246, 323, 314.5

[56] References Cited

UNITED STATES PATENTS

| 2,225,302 | 12/1940 | Hartwell | 260/314.5 |
|---|---|---|---|
| 2,284,685 | 6/1942 | Detrick et al. | 260/314.5 |
| 2,549,842 | 4/1951 | Moser | 260/314.5 |
| 2,556,727 | 6/1951 | Lane et al. | 260/314.5 |
| 2,900,390 | 8/1959 | Brouillard et al. | 260/314.5 |
| 2,982,666 | 5/1961 | Chun et al. | 260/314.5 |
| 3,004,986 | 10/1961 | Kirby | 260/314.5 |
| 3,127,412 | 3/1964 | Gaertner et al. | 260/314.5 |
| 3,137,704 | 6/1964 | Raab et al. | 260/314.5 |
| 3,351,481 | 7/1967 | Hopmeier et al. | 260/314.5 |

OTHER PUBLICATIONS

Fiat Report 1313, p. 303, (2/1948).

*Primary Examiner*—John D. Randolph
*Attorney, Agent, or Firm*—Curtis, Morris & Safford

[57] ABSTRACT

A process for the preparation of highly pure organic pigments which comprises converting organic dyestuffs having various degrees of purity into dyestuff salts capable of being isolated by means of suitable acids which dissolve the impurities contained in the dyestuff, separating them from the acid, recovering the dyestuffs in pure form from the dyestuff salts by the action of water and subjecting the isolated dyestuff in aqueous organic or aqueous-organic medium to a mechanical fine dispersion. By this process the dyestuff formed by the decomposition of the dyestuff sulfate is obtained in highly pure form and can extremely well be brought into a finely dispersed form so that it can be brought into pigment form already by short-time grinding. During the preparation and isolation of the dyestuff sulfate the sulfuric acid is obtained in such a high concentration that it can be regenerated in an economical manner and any ecological charge is avoided.

2 Claims, No Drawings

PROCESS FOR THE PREPARATION OF HIGHLY PURE HALOGENATED PHTHALOCYANINE PIGMENT

The present invention provides a process for the preparation of highly pure pigments by treating crude dyestuffs with suitable acids capable of forming salt with the dyestuffs which dissolve the impurities, and following mechanical fine dispersion of the pure dyestuffs to the pigment, which process does not raise problems as to the waste water.

To bring a crude dyestuff into a form such that it can be used as pigment in industry, it must generally be purified and subjected to a finishing process. The purification and finishing step is for example combined in the process known for a long time with respect to phthalocyanines, which consists in dissolving the crude dyestuff in concentrated sulfuric acid and introducing the solution into a large excess amount of water.

It is also known to suspend the crude dyestuff in 60–90% sulfuric acid and to finely disperse the suspension of the dyestuff sulfate formed by introducing or spraying it into an excess amount of water where the original dyestuff is set free.

This method, however, has the disadvantage that a great part of the impurities which are insoluble in dilute sulfuric acid are reprecipitated so that the dyestuff is, certainly, finely dispersed but not enough purified.

Therefore, processes had been described according to which the crude dyestuff is dissolved in concentrated sulfuric acid and then the concentration of sulfuric acid is reduced by adding water only to such an extent that the impurities remain in the acid in dissolved state, the dyestuff, however, precipitates at the same time in the form of its sulfate and can be isolated. The fine dispersion then takes place as it is described in U.S. Pat. No. 2,284,685 by redissolving the dyestuff sulfate in concentrated sulfuric acid and introducing or spraying the solution in a large excess amount of water.

However, the decisive drawback of the processes which have been proposed is that the filtration of the large amounts of strongly dilute, sulfuric acid pigment suspension requires a considerable technical and time-consuming expenditure and that large amounts of strongly contaminated and dilute sulfuric acid are formed raising problems as to their elimination via the waste water and to their expensive regeneration.

It was found that highly pure pigments having good properties and raising no problems as to the waste water can be prepared when acid resistant crude dyestuffs having various degrees of purity are converted into dyestuff salts by means of suitable acids, isolated at a suitable acid concentration, set free again in pure form by decomposing the dyestuff salts with dyestuff, filtered, washed with water until free from acid and converted into the pigment form by finely dispersing them mechanically without charging the waste water.

Suitable acids are all those which dissolve the impurities contained in the crude dyestuffs and form salts capable of being isolated with the dyestuffs used and which can be regenerated by means of economical technical methods.

The acids especially suitable for the process of the invention are, for example, sulfuric acid or oleum. Highly concentrated hydrohalic acids or halogenated acetic acids may, for example, also be used.

The process of the invention can, in principle, be used for all dyestuffs which are stable towards dilute and concentrated acids, especially towards sulfuric acid and can be converted into salts capable of being isolated from which the original dyestuff can be recovered with water.

For example quinacridones, perylene tetracarboxylic acid dyestuffs, polycyclic quinones, phthalocyanines, dioxazines, indigo and thioindigo dyestuffs and derivatives of these dyestuffs stable towards acid, as well as azo dyestuffs stable towards acid can be used. Halogenated copper phthalocyanines, especially highly halogenated copper phthalocyanines are particularly interesting.

From the series of the quinacridones, the linear trans-quinacridones preparable according to the known processes are especially used which may be substituted in symetrical or asymetrical order, for example 2,9-dichloro, 2,9-dimethoxy, 2,9-dimethyl, 3,10-dimethyl, 3,10-dichloro, 3-methyl, 2-chloro, 4-chloro, 2,3-dichloro, 2-chloro-4-methyl- or 2,9-dichloro-4,11-dimethyl-trans-quinacridone, 3,4,10,11-tetrachloroquinacridone, 1,4,8,11-tetrachloro-quinacridone or 2,4,9,11-tetramethoxy-quinacridone.

Moreover, trans-quinacridones carrying substituents stable towards acid different from those mentioned above, are also suitable, as well as cis-quinacridones and angular quinacridones.

The denomination "perylene tetracarboxylic acid dyestuffs" refers to the class of compounds of the general formula

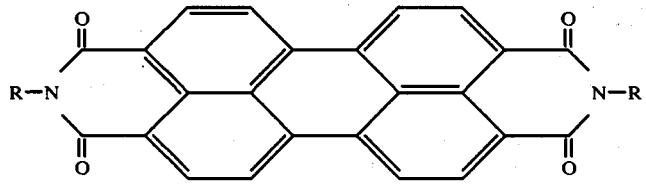

in which R may be, for example an alkyl, aryl, arylalkyl, alkoxy or a heterocyclic radical which may itself be substituted by various groups stable towards acid.

Moreover, the perylene fundamental structure may also carry substituents stable towards acid, preferably halogen.

The polycyclic quinones comprise, for example, dyestuffs the structures of which are obtained by condensation of a quinonic radical with aromatic radicals, for example, anthanthrones, flavanthrones, pyranthrones, dibenzpyrene-quinones, anthraquinones having fused aromatic radicals, perinones and diperinones, violanthrones, isoviolanthrones and the derivatives thereof stable towards acid, preferably halogenated products.

A dyestuff sulfate is, for example, prepared by dissolving the dyestuff in a 96–100% sulfuric acid or in oleum and following dilution with water or dilute sulfuric acid to achieve a content of acid at which the dyestuff sulfate precipitates in a form capable of being filtered. The dyestuff sulfate may also be prepared by suspending the dyestuff in sulfuric acid, the concentration of acid being chosen such that it is sufficient to completely convert the dyestuff into the sulfate, which generally occurs within a range of 70–100% of concentration of the sulfuric acid.

The formation of dyestuff sulfate can, generally, be recognized by the formation of characteristically formed crystals and by the colour mostly different from the pure dyestuff.

The amount of sulfuric acid may vary widely, it is however advantageous to use four to twenty times the amount, calculated on the dyestuff. Depending on the nature of the dyestuff used it may be advantageous to prepare the dyestuff sulfate either at 20°–30° C or at elevated temperature.

As soon as the total dyestuff is converted into the sulfate capable of being isolated it is isolated by filtration and freed from adhering stock-liquor by washing it with a small amount of 70–96% sulfuric acid. The pure dyestuff is set free from the isolated dyestuff sulfate by the action of water. The sulfate may be washed until free from acid either directly with water or it is introduced into water by stirring, the neutral dyestuff formed is isolated and washed until free from acid. The aqueous filter cake of the dyestuff is then brought into pigment form by mechanical fine dispersion.

For this purpose all the methods can be used by which the dyestuffs are comminuted to grains of pigment size, for example by finely dispersing them in kneaders, high-speed stirring mixers having a grinding effect or in grinding aggregates the principle of which is based on the bouncing effect or the mutual friction of the grinding bodies by rotation or vibration.

The fine dispersion is preferably effected on a roller mill, a vibration mill or a bead mill using the grinding bodies usual in practice and under the usual conditions.

Suitable grinding media are water, organic liquids and, above all, homogeneous mixtures of water and organic liquids. Emulsions of water and organic liquids which are completely or only partly insoluble in water, can also be used as grinding media. Organic liquids are, for example, alcohols, ketones, carboxylic acids, esters, ethers, hydrocarbons, halohydrocarbons, amines and carboxylic acid amides. Especially favourable results are obtained when using homogeneous mixtures of alcohols and water as grinding media. Aqueous solutions of primary, secondary and tertiary aliphatic alcohols having 4 to 6 carbon atoms are preferred, for example isobutanol, tertiary butanol or cyclohexanol.

When using organic liquids as grinding medium the water adhering to the filter cake is expelled before grinding is started and the fine dispersion is effected in the anhydrous medium using an organic liquid, for example, isopropanol or xylene.

The grinding process can be effected by optionally adding substances which facilitate the grinding and then volatilize under the drying conditions of the grinding body without any residue being left and can be recovered by condensation, or which improve the properties of the ground pigment itself and therefore need not be eliminated. Those substances are, for example cation-active, anion-active or neutral surface-active substances in the usual amounts.

After grinding, the dyestuff can be separated from the grinding bodies and dried in usual manner. In special cases, the pigment paste can be after-treated, before being dried, by heating with water and/or liquids miscible with water or not is suitable open or closed vessels.

The sulfuric acid of 70–96% strength obtained by the filtration of the dyestuff sulfate can again be used for the purification of the dyestuff, optionally after being brought to the original acid concentration and after having replaced the amounts of sulfuric acid lost. The acid can so be used several times without regeneration.

More contaminated sulfuric acid can, however, be purified according to the known regeneration methods in economical manner because of its high acid content and can then be reused. The regeneration methods used are the process of Pauling, the thermal splitting process or the distillation.

The dilute sulfuric acid formed under the decomposition with water when washing the dyestuff sulfate to become neutral is totally free from inorganic and organic impurities and can, therefore, be reused for the precipitation of the dyestuff sulfate from concentrated sulfuric acid, or it can be reconcentrated according to the immersion heater method and reused for the dyestuff purification.

The decisive advantage of the process of the invention lies in the fact that during the preparation and isolation of the dyestuff sulfate the sulfuric acid is obtained in such a high concentration that it can be regenerated in an economical manner and any ecological charge is avoided.

A further, decisive advantage of the process of the invention is that the dyestuff formed by the decomposition of the dyestuff sulfate is obtained in highly pure form and can extremely well be brought into a finely dispersed form so that it can be brought into pigment form already by short-time grinding.

As the dyestuff is ground in purest form no impurities of any kind penetrate into the grinding medium by the grinding process. The pigment is separated from the grinding medium in usual manner by filtration and yields, for example if water had been used as grinding medium, a filtrate neutral with respect to waste water.

If grinding is carried out in organic liquids they can be reused as grinding medium without regeneration after filtration.

The process, however, is especially simplified and reduced to low costs because, due to the high purity of the dyestuff obtained, the expensive filtration after grinding becomes completely unnecessary and the grinding mixture can directly be evaporated in suitable drying apparatus after separation of the grinding bodies.

The pigments prepared in accordance with the invention are suitable for coloring lacquers, paper, plastics materials and synthetic resins, for coloring synthetic fibers in the mass, for printing paper and textile materials and for metal effect lacquerings as well as painting colors and inks.

The following examples illustrate the invention, the parts and percentages being by weight unless stated otherwise and the temperature being indicated in degrees celsius.

EXAMPLE 1

33 Parts of crude copper phthalocyanine having a chlorine content of 48% were introduced into 500 parts of concentrated sulfuric acid and stirred at 25°–30° C during 8 hours, 65 parts of water were added dropwise at 70°–80° C and the crystalline mass of copper phthalocyanine was suction-filtered via an acid-resistant filter. The mixture was washed with about 160 parts of 80% sulfuric acid and the filter cake was then introduced into 330 parts of water at 25°–30° C, it was suction-filtered and washed with water until free from acid. Yield: 93 parts of aqueous filter cake having a content of solid body of 35%.

The filter cake so prepared was ground with 117 parts of water and 1200 parts of quarzite beeds of about 2 mm diameter in a porcelaine mill for 15 hours on a vibration table. The grinding bodies were separated, filtered and dried in vacuo at 60° C. Yield: 31.1 parts of pigment.

The pigment so prepared allows to color enamel lacquers according to known methods in brilliant green shades of high color strength and being highly transparent.

EXAMPLE 2

33 Parts of copper phthalocyanine having a chlorine content of 48% were purified in a manner analogous to that described in example 1 using the sulfuric acid filtrate of about 85% obtained upon purification according to example 1, the concentration of sulfuric acid of the filtrate used before being made up to 96–100% sulfuric acid by adding oleum.

The sulfuric acid more strongly contaminated which was obtained after using the filtrate several times was regenerated by distillation.

EXAMPLE 3

50 Parts of 80% crude copper phthalocyanine (having a chlorine content of 48–49%) were introduced into 400 parts of concentrated sulfuric acid and stirred at 25°–30° C after having added a small amount of sodium nitrite until the conversion into the dyestuff sulfate was completed. 52 Parts of water were added at 70°–80° C and the crystalline mass of the copper phthalocyanine sulfate was suction-filtered at room temperature via an acid-resistent filter. It was washed again with about 200 parts of 80% sulfuric acid, the filter cake was introduced at 25°–30° C into 400 parts of water, suction-filtered and washed with water until free from acid. Yield: 98 parts of aqueous filter cake having a content of solid body of 40%.

The filter cake so prepared was ground with 131 parts of water, 15 parts of isobutanol and 1300 parts of quarzite beads of about 1 mm diameter in a porcelaine mill for 15 hours on a vibration table. The grinding bodies were separated and the grinding mass was evaporated at 60° C to dryness in vacuo. Yield: 39 parts of pigment.

Enamel lacquers can be colored according to known methods using the pigment so prepared in brilliant green shades being highly transparent.

The colorings on polyvinyl chloride obtained according to the known methods excel by a high color strength and purity of the shade.

When using in the aqueous-organic grinding medium 15 parts of tertiary butanol or 15 parts of tertiary amyl alcohols or 7 parts of cyclohexanol instead of 15 parts of isobutanol the pigments obtained have a comparable quality.

EXAMPLE 4

28 Parts of 90% perchlorinated crude copper phthalocyanine (chlorine content 48–49%) were introduced into 250 parts of 100% sulfuric acid and stirred for several hours at 70°–80° C under nitrogen atmosphere after the addition of a small amount of nitrosyl sulfuric acid until the conversion into the dyestuff sulfate had been completed. 44 Parts of water were added dropwise at 70°–80° C. After cooling to 20°–30° C the dyestuff sulfate was suction-filtered on an acid-resistant filter and washed with 80 parts of 80% sulfuric acid. The filter cake was then washed with water until neutral.

62 Parts of a 40.3% aqueous filter cake of perchlorinated pure copper phthalocyanine were obtained which corresponded to 25 parts of pure dyestuff.

The filter cake so prepared was ground with 88 parts of acetone and 1200 parts of quarzite beads of a 2 mm diameter in a porcelaine mill for 20 hours on a vibration table. Then, the dyestuff suspension was separated from the grinding bodies and evaporated to dryness at 60° C in vacuo.

When coloring burning lacquers with the dyestuff so prepared, brilliant green shades of high color strength were obtained. The pigment dyestuff is distinguished, as compared with the known products of the commerce, additionally by a decisively improved dispersability of lacquers.

A pigment dyestuff of comparable quality was obtained when the dyestuff suspension was finely dispersed by a continuous bead grinding instead a vibration grinding and then continuously evaporated to dryness under normal pressure.

When using instead of perchlorinated copper phthalocyanine, hexadecabromo-copper phthalocyanine, a pigment dyestuff was obtained which yielded yellowish green shades of high color strength upon coloring enamel lacquers.

EXAMPLE 5

25 Parts of perchlorinated pure copper phthalocyanine (in the form of the 62 parts of a 40.3% aqueous filter cake described in example 4) were introduced into 150 parts of a technical-grade xylene mixture. Then the water was cycled out. The anhydrous dyestuff suspension was ground with 1200 parts of quarzite beads of a 2 mm diameter in a porcelaine mill for 20 hours on a vibration table. Then, the dyestuff suspension was separated from the grinding bodies. The suspension was stirred at 150°–160° C for 3 hours in an autoclave. After cooling to a temperature below 100° C the dyestuff was suction-filtered and dried at 100° C in vacuo.

The pigment dyestuff so prepared yielded brilliant green shades of high color strength when coloring enamel lacquers. The colorings had a higher covering property than those prepared with the use of the pigments prepared according to example 1 or example 4. They can excellently be dispersed in lacquer systems.

The colorings of polyvinyl chloride obtained according to known methods are distinguished by a high tinctorial strength and purity of the shade.

EXAMPLE 6

35 Parts of N,N'-dimethylperylene-3,4,9,10-tetracarboxylic acid diimide (95% strength) were dissolved in 330 parts of concentrated sulfuric acid. 67 Parts of water were added dropwise at 50°–60° C, the precipitated dyestuff sulfate was filtered via an acid resistant filter and washed with 160 parts of 80% sulfuric acid.

The filter cake was introduced, while stirring in 330 parts of water, suction-filtered and washed with water until free from acid. About 81 parts of an aqueous filter cake were obtained having a content of 40% solid body.

The filter cake so obtained was ground with 129 parts of water and 1200 parts of quarzite beads of about 2 mm diameter in a porcelaine mill on a vibration table for 15 hours. After separation of the grinding bodies filtering followed and then drying at 60° C in vacuo. The pigment so prepared allowed to color enamel lacquers according to known methods in clear red shades of high color strength.

EXAMPLE 7

30 Parts of 2,9-dimethyl-trans-quinacridone were dissolved in 600 parts of concentrated sulfuric acid. 150 Parts of water were added dropwise to the blue solution at 50°–70° C, the crystalline needles were filtered via an acid-resistant filter and washed with about 200 parts of 80% sulfuric acid. The filter cake was introduced into 300 parts of water, the dyestuff set free was filtered and washed with water until free from acid.

69 Parts of an aqueous filter cake were obtained having a content of solid body of 40%.

The filter cake was ground with 158 parts of water and 1200 parts of quarzite beads of a 2 mm diameter for 8 hours in a porcelaine mill on a vibration table and evaporated to dryness after separation from the grinding bodies.

The pigment so obtained colored enamel lacquers in clear red shades of high brilliance and tinctorial strength.

EXAMPLE 8

30 Parts of crude flavanthrone were dissolved in 300 parts of concentrated sulfuric acid. 36 Parts of water were added dropwise at 50°–70° C, the flavanthrone-sulfate crystals formed were suction-filtered via an acid-resistant filter at room temperature and washed with about 150 parts of 80% sulfuric acid. The filter cake was introduced while stirring into 300 parts of water, the dyestuff was filtered and washed with water until free from acid. 63 Parts of an aqueous filter cake were obtained having a content of solid body of 43%.

The filter cake was ground with 174 parts of water and 1200 parts of quarzite beads of about 2 mm diameter for 15 hours in a porcelaine mill on a vibration table. The grinding paste separated from the grinding bodies was filtered and dried in vacuo at 60° C.

The stoving lacquers colored with the pigment so obtained were distingushed by a pure yellow shade and a high tinctorial strength.

EXAMPLE 9

30 Parts of crude 4,10-dibromo-anthanthrone were dissolved in 750 parts of concentrated sulfuric acid. 90 Parts of water were then added dropwise at 50°–70° C, the dyestuff sulfate was filtered via an acid-resistant filter and washed with 300 parts of 80% sulfuric acid. The filter cake was introduced into 300 parts of water, while stirring, the dyestuff formed was suction-filtered and washed with water until free from acid. 117 Parts of an aqueous filter cake were obtained which had a content of solid body of 23%.

The filter cake was ground with 120 parts of water and 1200 parts of quarzite beads of about 2 mm diameter for 15 hours in a porcelaine mill on a vibration table and evaporated to dryness after separation from the grinding bodies.

The pigment so obtained colored enamel lacquers in pure orange shades of high tinctorial strength.

We claim:
1. A process for the preparaton of a highly pure, acid-stable highly halogenated copper phthalocyanine pigment which consists of the steps of: converting the crude, highly halogenated copper phthalocyanine by means of concentrated sulfuric acid or oleum into the sulfate, isolating the sulfate, hydrolizing the sulfate, isolating the highly halogenated copperphthalocyanine and grinding it in a mixture of water and an alcohol having from 4 to 6 carbon atoms.
2. A process as claimed in claim 1, wherein the grinding medium is an aqueous solution of an alcohol of 4 to 6 carbon atoms.

* * * * *